United States Patent [19]

Hitomi et al.

[11] Patent Number: 4,958,606

[45] Date of Patent: Sep. 25, 1990

[54] SUPERCHARGED ENGINE

[75] Inventors: Mitsuo Hitomi; Junso Sasaki; Akira Takai, all of Hiroshima; Kazuaki Umezono; Fumio Hinatase, both of Aki, all of Japan

[73] Assignee: Mazda Motor Corporation, Hiroshima, Japan

[21] Appl. No.: 125,982

[22] Filed: Nov. 27, 1987

[30] Foreign Application Priority Data

| Nov. 27, 1986 [JP] | Japan | 61-282624 |
| Nov. 27, 1986 [JP] | Japan | 61-282625 |
| Feb. 9, 1987 [JP] | Japan | 62-27947 |

[51] Int. Cl.$^5$ .................. F01L 1/34; F02D 39/08
[52] U.S. Cl. .................. 123/316; 123/559.1; 123/90.15
[58] Field of Search .......... 123/316, 90.15, 90.10, 123/324, 90.6, 559.1; 60/599

[56] References Cited

U.S. PATENT DOCUMENTS

| 2,266,077 | 12/1941 | Roan | 123/90.16 |
| 2,997,991 | 8/1961 | Roan | 123/90.16 |
| 3,015,934 | 1/1962 | Miller | 123/316 |
| 4,106,471 | 8/1978 | Nakajima et al. | 123/324 |
| 4,327,676 | 5/1982 | McIntire et al. | 123/90.6 |
| 4,539,815 | 9/1985 | Garcea | 60/599 |

FOREIGN PATENT DOCUMENTS

| 56-171630 | 12/1981 | Japan . |  |
| 0010112 | 1/1983 | Japan | 123/90.15 |
| 59-172228 | 11/1984 | Japan . |  |
| 61-19933 | 1/1986 | Japan . |  |
| 0187543 | 8/1986 | Japan | 123/90.15 |

*Primary Examiner*—Andrew M. Dolinar
*Assistant Examiner*—M. Macy
*Attorney, Agent, or Firm*—Wenderoth, Lind & Ponack

[57] ABSTRACT

A supercharged engine has a geometric compression ratio of more than 8.5, and engine specifications are set to establish a relation, $Y \geq -1.75X + 10$, in which an intake port closing timing Y is expressed by a crank angle after the piston reaches BDC and an overlapping angle X is expressed by a crank angle for an overlapping time period during which the intake valve and exhaust valve are both open.

40 Claims, 9 Drawing Sheets

※ Pressure in cylinder of conventional engine

SUPERCHARGED ENGINE

BACKGROUND OF THE INVENTION

1. Field of the Invention

The present invention relates to a supercharged engine which has a high geometric compression ratio.

2. Description of the Prior Art

A variety of engines are known in the prior art in which a supercharger is employed for supercharging intake air to increase an intake air charge density in the engine as disclosed in, for example, Laid-Open Japanese Utility Model Application No. 56-171630 and Laid-Open Japanese Patent Application No. 61-19933. Types of superchargers which are known include a turbocharger driven by exhaust gases, and a mechanical supercharger driven by an engine output shaft.

In the engine having a supercharger, the exhaust temperature tends to rise excessively at the time of high supercharge particularly during a high-speed, high-load operation of the engine. In order to restrain such an excessive temperature rise and to maintain the reliability of the exhaust system, conventional engines are designed to lower the exhaust temperature with evaporative latent heat by enriching an air-fuel ratio during a high-speed, high-load operation. However, if the air-fuel ratio is enriched as such, a larger quantity of fuel than required for engine power output is supplied, thus resulting in increased fuel consumption.

In the meantime, the aforementioned lowered fuel economy might be compensated for by raising the cycle efficiency of the engine. To achieve this, a high geometric compression ratio is required. Conventional supercharged engines, however, have a drawback in that if the compression ratio is increased, knocking is likely to occur during high supercharge; therefore, the geometric compression ratio must be established at a relatively low value of 8.5 or less.

SUMMARY OF THE INVENTION

The present invention has been accomplished in an attempt to effectively solve the problems mentioned above, and it is therefore an object of the invention to provide a supercharged engine in which fuel economy is enhanced and the exhaust temperature is comparatively low during high-speed, high-load operation.

According to the present invention, a geometric compression ratio of the engine is more than 8.5 while engine performance specifications are designed so that the relationship between an intake port closing timing Y expressed by a crank angle taken from bottom dead center (BDC) and an overlap angle X expressed by a crank angle for a period during which both the intake valve and an exhaust valve are open, is $$Y \geq -1.75X + 10.$$

The term "geometric compression ratio" used herein refers to a ratio of a cylinder capacity, when a piston is at BDC, to a clearance volume, while a ratio of a cylinder capacity, measured at the time the intake valve is closed, to the clearance volume shall be referred to as an "effective compression ratio".

In a supercharged engine having the aforesaid constitution, the geometric compression ratio is larger than that of conventional supercharged engines. Since the aforementioned intake port closing timing, however, is delayed more than in conventional supercharged engines, if the overlap angle is maintained at a conventional level, an effective compression ratio is established that is low despite the high geometric compression ratio whereby combustion stability is ensured even during high-speed, high-load operation in which a large amount of supercharged mixture is fed in. Furthermore, since expansion ratio increases with the increase of the geometric compression ratio, not only is the exhaust gas temperature lowered but also the cycle efficiency is enhanced within the high supercharge region. At high geometric compression ratios, exhaust gas scavenging efficiency lowers with a decrease in the overlap angle, resulting in a corresponding rise of intake gas temperature which tends to cause knock. The poor scavenging efficiency also lowers the charging efficiency, accompanied by a sudden decrease of a mean effective pressure. In the present invention, however, the overlap angle and the intake port closing timing are set to the aforementioned relationship; therefore, when one of the former and the latter is fixed, the other will be designed to be in excess of a specific amount, thereby effecting a necessary scavenging efficiency, decreasing the effective compression ratio, and lowering exhaust temperatures through the increase of expansion ratio. Thus, the aforesaid knocking can be eliminated while improving the cycle efficiency of the engine.

Other features and advantages of the present invention will become apparent from the following description of preferred embodiments thereof when taken with the accompanying drawings.

BRIEF DESCRIPTION OF THE DRAWINGS

The present invention will become more fully understood from the detailed description set forth hereinbelow and the accompanying drawings which are illustrative and not limitative of the present invention, and wherein.

DETAILED DESCRIPTION OF THE PREFERRED EMBODIMENTS

Two preferred embodiments of the present invention will now be described by referring to the accompanying drawings.

Figure 1:
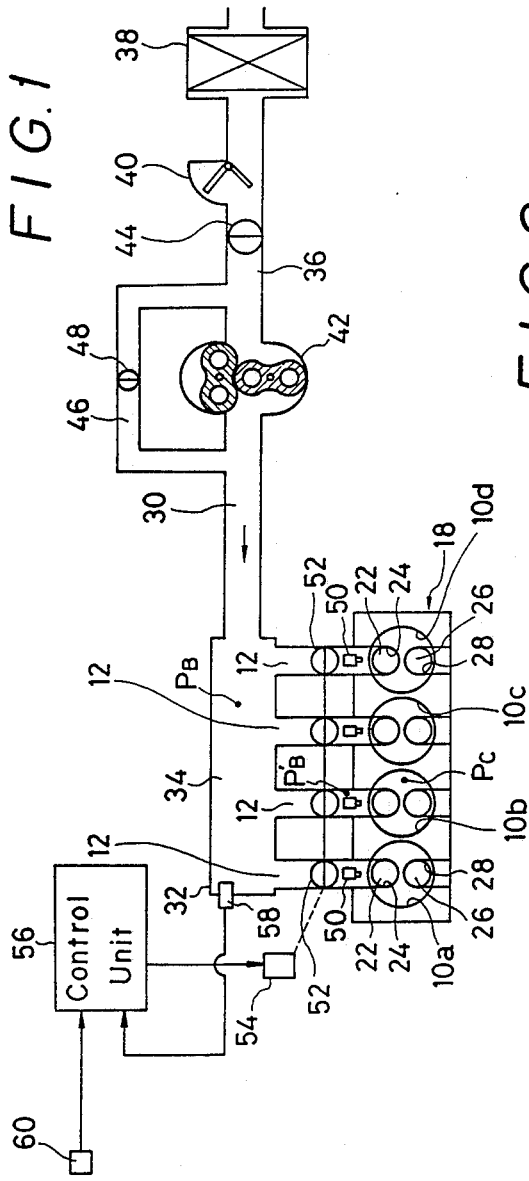
FIG. 1 is a schematic block diagram of a supercharged engine in accordance with a first embodiment of the invention.
Figure 9:
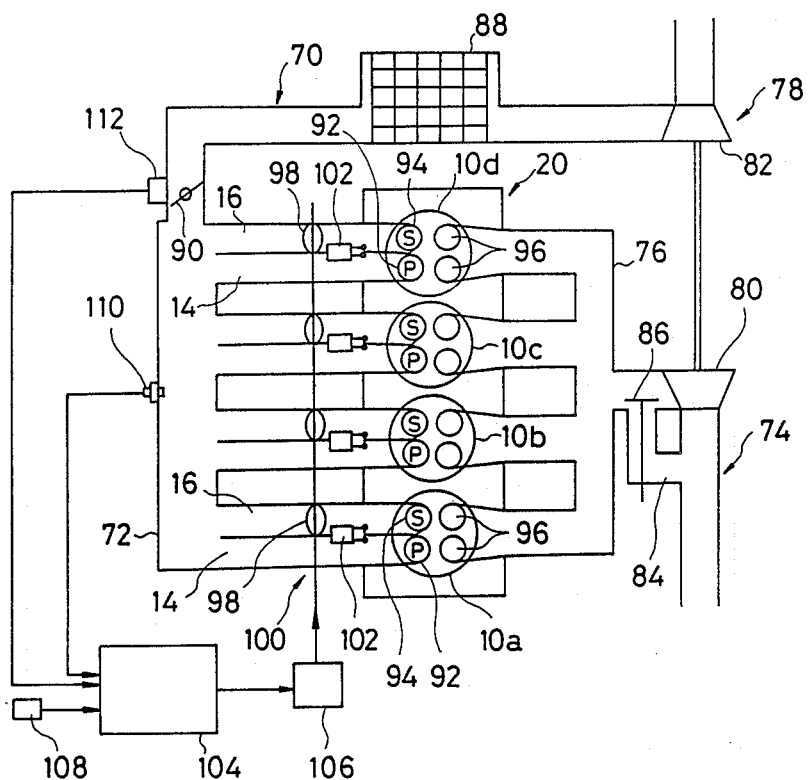
FIG. 9 is a schematic block diagram of a supercharged engine in accordance with a second embodiment of the invention.

A first embodiment, as shown in FIG. 1, includes an engine 18 having one independent intake air passage 12 for each of the cylinders 10a through 10d, while a second embodiment, as shown in FIG. 9, includes an engine 20 having two independent intake air passages 14 and 16 for each of cylinders 10a through 10d.

First Embodiment

FIG. 1 shows the general structure of a first embodiment of the present invention, in which numeral 18 is a fuel injection-type 4-inline engine having first to fourth cylinders 10a through 10d. Each of the cylinders 10a through 10d is provided with an intake port 24 which is opened and closed by an intake valve 22 and an exhaust port 28 which is opened and closed by an exhaust valve 26. In the engine 18 of the present invention, the geometric compression ratio is high, i.e. more than 8.5.

With respect to each of the intake and exhaust valves 22 and 26, the time periods during which the valves are open overlap, and the "opening" of the valves is set based on a valve lift of 1 mm. The overlapping time period, during which both valves are open, can be expressed by a crank angle which will be referred to as an overlap angle X. In the present embodiment, this overlap angle X is widely set around the top dead center (TDC) as shown in FIG. 2.

Also, the intake port 24 is "closed" when the intake valve 22 reaches a position corresponding to 1 mm of lift, and the crank angle taken from bottom dead center (BDC) is used to express the intake port closing timing Y. In the embodiment, this timing Y is set to terminate after BDC as shown in FIG. 2.

Figure 2:
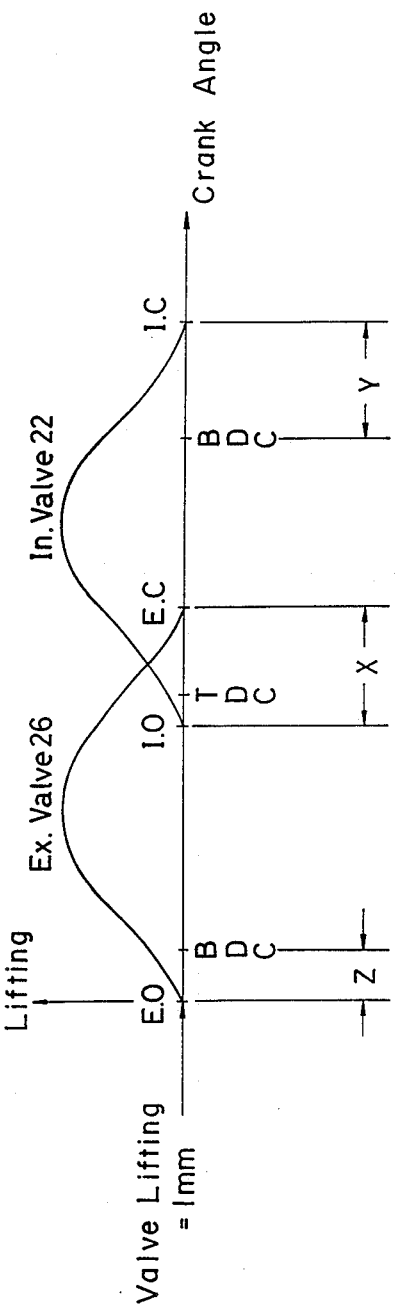
FIG. 2 if a characteristic curve diagram showing a valve lift of intake and exhaust valves.

Additionally, if the crank angle taken before BDC, with the exhaust valve 26 opening based on a lift of 1 mm, is used to define the exhaust port opening timing Z, this timing Z occurs relatively close to BDC as shown in FIG. 2.

If the crank angle at a full stroke of the piston is S (=180 degrees), adiabatic compression takes place during (S−Y) and adiabatic expansion occurs during (S−Z). The exhaust gas temperature can be lowered simply by setting the adiabatic expansion stroke to be longer than the adiabatic compression stroke to thereby cool down combustion gases during the adiabatic expansion thereof. Therefore, a relation in which (S−Y)<(S−Z), namely Y>Z, is effective to lower the exhaust temperature. Since cylinder scavenging of exhaust gases by intake gases can effectively be done when the overlap angle X is large, the overlap angle X is set to a specific value that improves the scavenging efficiency during high supercharge.

Next, the correlation of the intake port closing timing Y to the overlap angle X will be described by referring to FIG. 3. In this drawing, the intake port closing timing Y is set along the vertical axis and the overlap angle X is set along the horizontal axis; and values of mean effective pressure Pe (kg/cm$^2$) obtained by experiments just before knocking, that is, maximum Pe without causing knocking at a speed of 1500 rpm which is a typical engine speed during normal operation, are plotted. The geometric compression ratio was 9.4 in the above experiments, but similar results were observed at other compression ratios over 8.5.

Figure 3:
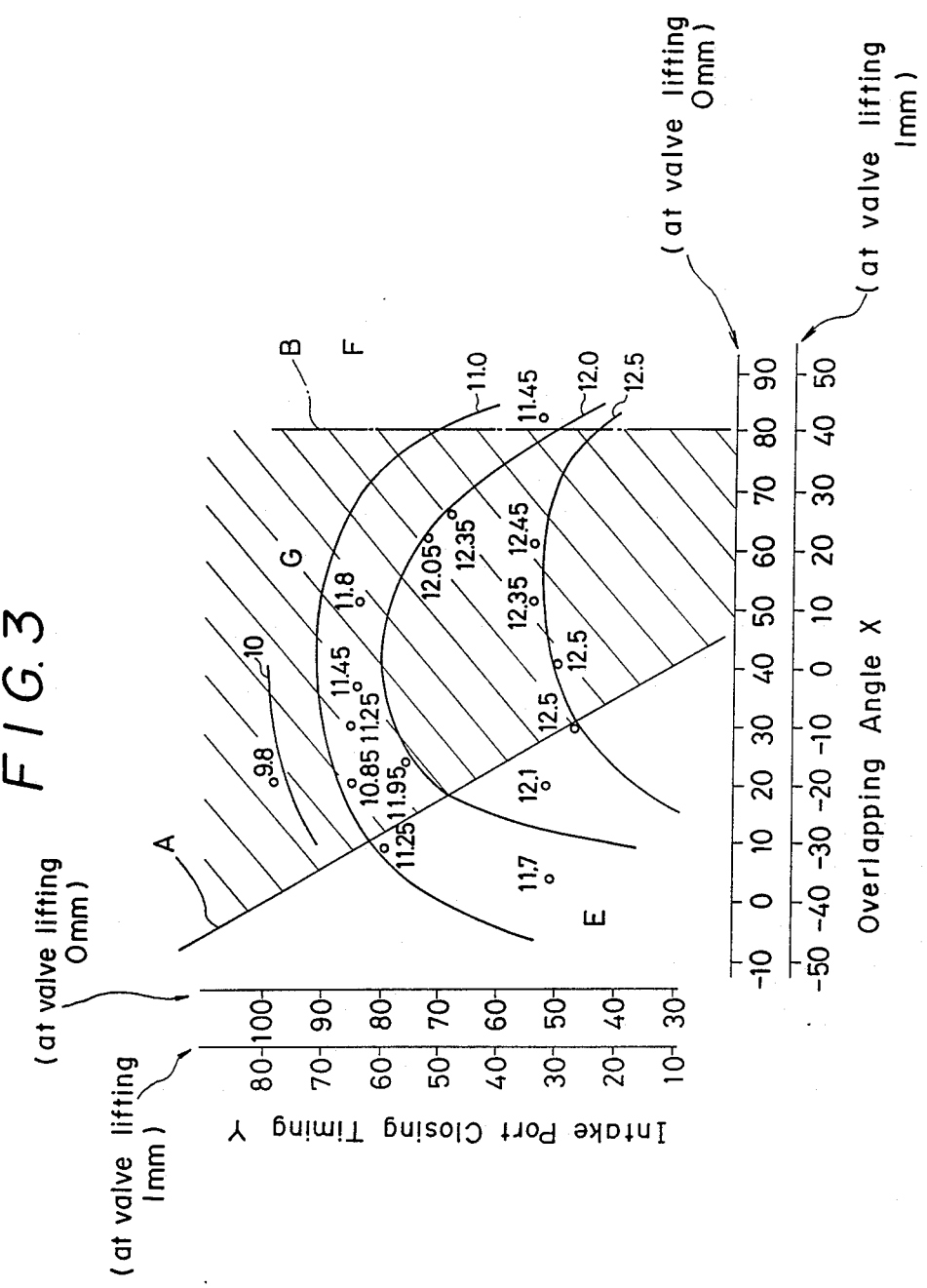
FIG. 3 is a graph in which a mean effective pressure is correlated to an intake valve closing timing and an overlap angle.

As is clear from FIG. 3, if the intake port closing timing Y is viewed over a range of specific values (in other words, in a range of specific effective compression ratios), there can be observed a region E where the mean effective pressure Pe decreases excessively with a decrease in the overlap angle X. Since this region E encompasses specifications of an engine in which severe knocking would take place, X and Y should be set, when determining engine specifications, so as to effect a mean effective pressure outside this region E. In FIG. 3, if points where the mean effective pressures Pe suddenly decrease are connected by a line A, this line can be drawn nearly straight and can be expressed by a formula $$Y = -1.75X + 10.$$

Therefore, knocking can be prevented by designing the engine to have a mean effective pressure Pe falling outside the region E, i.e., by setting X and Y such that the following formula will be satisfied:

$$Y \geq -1.75X + 10 \ldots \qquad (1)$$

In FIG. 3, a line B denotes a boundary of a region F encompassing specifications of an engine in which a large amount of blowby would take place due to an excessive overlap angle X (X=40° or more). Consequently, by choosing engine specifications which effect a Pe falling within a region G defined between the regions E and F, i.e., the intake port closing timing Y and the overlap angle X, an engine will be established in which knocking and blowby will be prevented.

If X and Y are to be defined relative to a valve lift set at 0 mm, the aforesaid formula (1) can be expressed as $Y \geq -1.75X + 100$.

If one of the parameters used to obtain the plot of Pe in FIG. 3 is numerically fixed before concretely deducing the engine specifications, the allowable numerical range of the other parameters will become apparent, thus enabling one to efficiently determine the engine specifications.

The intake port 24 of each of the aforesaid cylinders 10a through 10d is connected to an intake passage generally indicated by numeral 30. This intake passage 30 comprises the independent passages 12 communicating at their downstream ends with the intake ports 24 of the cylinders 10a through 10d, a manifold 34 formed within a surge tank 32 and connected to the upstream ends of the independent passages 12, and a common passage 36 connected to the upstream end of the manifold 34, the upstream end of the common passage 36 being connected to an air cleaner 38.

In the aforesaid common passage 36, an air flow meter 40 for detecting the flow rate of intake air, a Roots-supercharger serving as a mechanical supercharger driven directly by the engine 18 to supercharge the intake air, and a throttle valve 44 for regulating the flow rate of intake air are disposed sequentially at the upstream side of the engine, i.e. from the air cleaner 38 toward the engine. The common passage 36 is provided with a bypass passage 46 which connects the portions of the intake passage immediately upstream and downstream of the supercharger 42 with each other; and operatively connected to the bypass passage 46 is a bypass valve 48 which opens and closes the passage 46.

A fuel injector 50 is disposed in each independent passage 12 communicating with the intake port 24 for injecting the fuel into each of the cylinders 10a through 10d. At the immediately upstream side of each fuel injector 50 is disposed a secondary throttle valve 52 comprising a butterfly valve which opens and closes the independent passage 12. These secondary throttle valves 52 are connected to a common actuator 54 and are opened and closed simultaneously by operating this actuator 54.

The actuator 54 for operating the secondary throttle valves 52 is controlled by a control unit 56. An intake pressure sensor 58 and an exhaust pressure sensor 60 are provided to send signals to the control unit 56, and the control unit 56 controls the actuator 54 to open the secondary throttle valves 52 during a high-load operating condition of the engine 18 at which the intake pressure in the intake air passage 30 has become higher than the exhaust pressure in the exhaust passage (not illustrated), and to close the valves 52 in other cases, for example during a light-load operating condition (idling) of the engine 18. Another sensing means may be employed instead of the intake pressure sensor 58 and exhaust pressure sensor 60, for indirect sensing, based on an operating condition of the region of a region where the intake pressure is to exceed the exhaust pressure.

It is, however, to be noted here that the secondary throttle valves 52 need not always be closed when the intake air pressure decreases below the exhaust gas pressure. For example, these valves 52 may be controlled to close only when the engine 18 is operated at a low-speed, low-load condition, for the purpose of increasing exhaust gas recirculation.

Description of Delayed Intake Port Closing Timing

In the present engine having a supercharger as described above, while the geometric compression ratio is higher than in conventional supercharged engines, the effective compression ratio ranges moderately lower due to the delay of the intake port closing timing. This relation is shown in FIG. 4.

Figure 4:
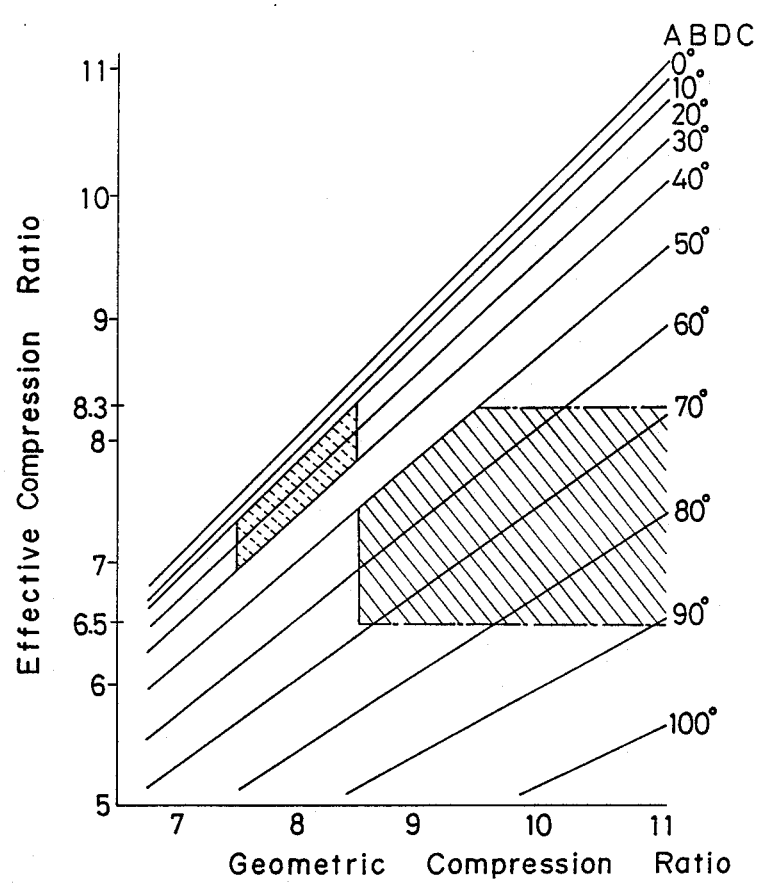
FIG. 4 is a graph showing a desirable range of the intake port closing timing as correlated with an effective compression ratio and a geometric compression ratio.

That is, FIG. 4 is a graph in which a desirable range of geometric compression ratios defines the horizontal axis, the effective compression ratio defines the vertical axis, and the intake port closing timing is plotted, with the overlap angle X fixed to −23° which is typical in conventional engines. In this drawing, the range indicated by oblique broken lines corresponds to the specifications in conventional engines having a supercharger, while the range indicated by oblique solid lines is a preferred range of the invention which defines an effective compression ratio moderately set by the geometric compression ratio and intake port closing timing.

In the conventional engines having a supercharger, as shown in this drawing, the geometric compression ratio is 7.5 to 8.5 and the intake port closing timing is around 20 to 40 degrees after BDC (ABDC). Within this range, a moderate effective compression ratio is obtained which ensures the prevention of knocking and which ensures combustion stability during high supercharge.

On the other hand, in the engine of the present invention, the geometric compression ratio is higher than that of conventional engines, i.e. more than 8.5, but the intake port closing timing is over 50 degrees ABDC, which represents a longer delay than conventional timing, thereby enabling the effective compression ratio to be established, for example, at conventional levels.

Alternatively, as the geometric compression ratio increases, clearance volume decreases resulting in a corresponding diminishment of residual gases and accordingly an enhancement of combustion stability. The effective compression ratio, therefore, can be set lower than conventional ones.

Figure 5:
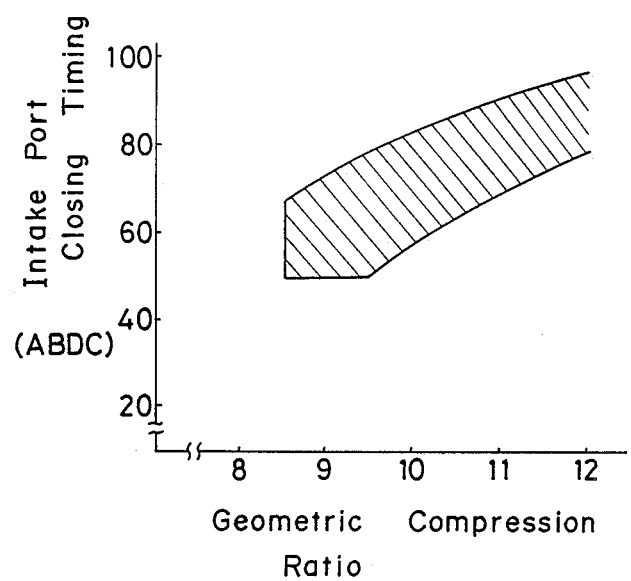
FIG. 5 is a graph showing a desirable range of the intake port closing timing as correlated with the geometric compression ratio.

It is desirable that the effective compression ratio be established within the specific range shown in FIG. 4. When the geometric compression ratio and the intake port closing timing are to be determined, it is possible to keep the effective compression ratio within the desired range by setting the intake port closing timing and the geometric compression ratio so that an effective compression ratio falling within the range indicated by oblique solid lines in FIG. 5 is obtained.

Thus, by establishing a moderate effective compression ratio, knocking can be prevented. Also, by setting the geometric compression ratio to a large value, the expansion ratio is set relatively high which enhances the cycle efficiency and accordingly improves fuel consumption. In addition, increasing the expansion ratio as compared with the effective compression ratio causes the exhaust gas temperature at the time of expansion to correspondingly become lower. Therefore, even during a high-speed and high-load operating condition of the engine, the reliability of the exhaust system can be maintained by limiting the rise of exhaust temperature without enriching the air-fuel rate as in conventional engines.

During medium- and low-load operation, fuel consumption can also be improved by diminishing pumping loss. Specifically, since during such operation conditions, an excessive amount of the air-fuel mixture drawn in is brought back into the intake system while the intake port is open after BDC with the throttle valve 44 so pre-adjusted as to reduce the negative intake pressure to a larger extent than in conventional engines, pumping loss caused by the negative intake pressure can be reduced.

Figure 6:
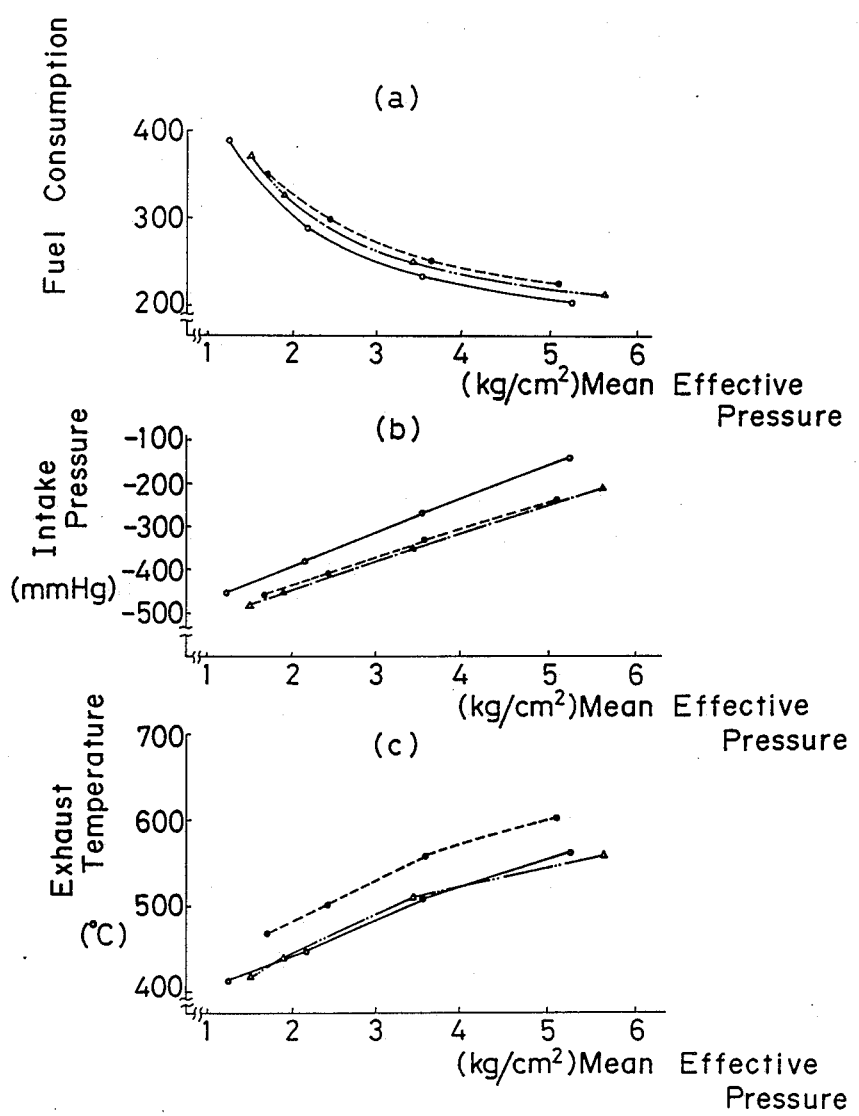
FIGS. 6(a) through (c) are graphs showing comparative test results of fuel consumption rate, intake pressure and exhaust gas temperature, respectively, between the engine of the present invention and conventional engines.

These effects can sufficiently be obtained by delaying the intake port closing timing over 50 degree ABDC, as will be apparent from FIGS. 6(a) through (c) showing experimental results.

FIGS. 6(a) through (c) show test data concerning fuel consumption, negative intake pressure, and exhaust gas temperature, respectively, at various mean effective pressures in the supercharged engine of the present invention, in a conventional supercharged engine, and in a non-supercharged (natural aspirated) engine. In each of these graphs, the solid-line curve indicates data produced by the engine of the present invention having a geometric compression ratio of 9.4 and an intake port closing timing of around 60 degrees ABDC; the broken-line curve indicates data produced by the conventional supercharged engine having a geometric compression ratio of 7.9 and an intake port closing timing of around 30 degrees ABDC; and the dash and dotted line curve indicates data produced by the non-supercharged engine having a geometric compression ratio of 9.4 and an intake port closing timing of around 30 degrees ABDC. Engine speed was set to 1500 rpm and the air-fuel ratio was $\lambda = 1$.

From this test data it is seen that, in the supercharged engine of the present invention, the fuel consumption is improved and the negative intake pressure is smaller as compared with either the conventional supercharged engine or the non-supercharged, high-compression ratio engine, and accordingly, pumping loss can be reduced. Similar results were also seen at other engine speed ranges. Furthermore, the exhaust gas temperature was observed to be lower than in the conventional supercharged engine. This means that the engine of the present invention allows a leaner ratio to be used than in conventional supercharged engines while restraining the excessive rise of exhaust temperature during high-speed, high-load operation of the engine.

Description of Increased Overlap Angle

Figure 8:
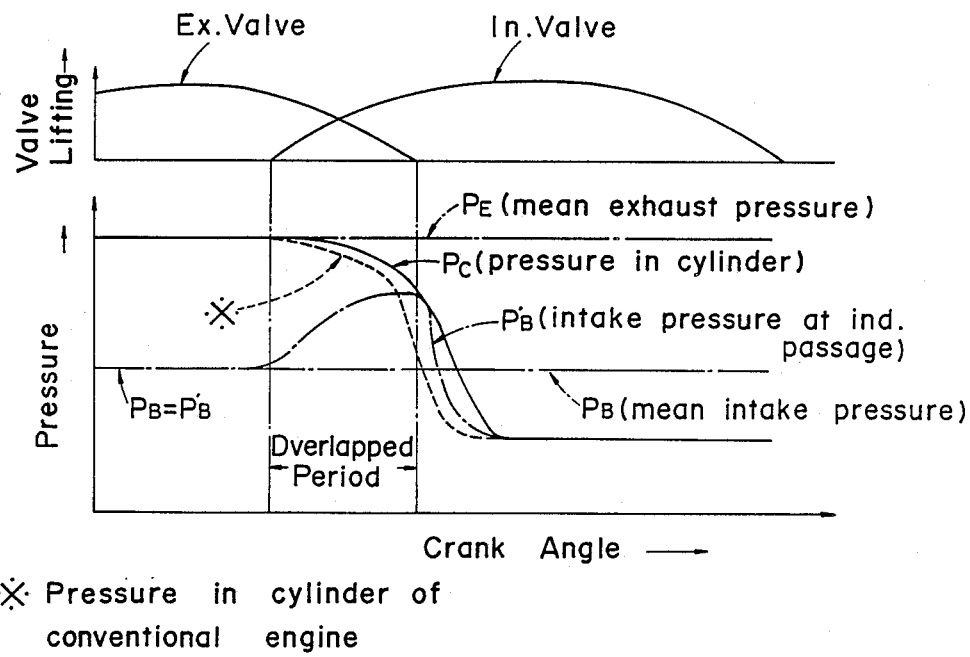
FIG. 8 is a characteristic diagram showing a relationship between the movement of valves and gas pressures of the present engine operating in a light-load condition.

In the first embodiment described above, when the intake air pressure in the passage 30 decreases below the exhaust gas pressure in the exhaust passage because of the throttling of the passage 30 by the throttle valve 44 during a light-load operation of the engine 18, exhaust gases in the exhaust passage recirculates into the cylinders 10a through 10d by virtue of a difference between the aforesaid intake air pressure and the exhaust pressure during the overlapping time period during which the intake and exhaust valves 22, 26 are open as shown in FIG. 8. This recirculation of the exhaust gases causes residual exhaust gases in the cylinders 10a through 10d to flow back into the independent passages 12.

However, during low-speed, light-load operation of the engine including during idling of the engine 18, each secondary throttle valve 52 is controlled to close by the unit 56, thus closing the passage 30 at a portion thereof near the intake port 24. Therefore, the exhaust gases that are flowing back stop in the independent passages 12 on the downstream side of the secondary throttle valves 52 and are prevented from flowing farther upstream.

Furthermore, the exhaust gases flowing back into the independent passage 12 increase pressure in the portion of passage 30 downstream of the valve 52, thereby reducing the pressure difference which causes the back flow of the exhaust gases and accordingly promotes the restraint of the back flow of the exhaust gases. This reduces the quantity of exhaust gases in the intake air to be drawn into the cylinders 10a through 10d during the intake stroke after the overlapping time period, thus assuring combustion stability during light-load operation of the engine 18.

In FIG. 8, PE denotes mean exhaust pressure in the exhaust passage; PB denotes mean intake air pressure in the manifold passage 34 in the surge tank 32; P'B denotes intake air pressure in the independent passage 12 on the downstream side of the secondary throttle valve 52; and Pc denotes pressure in the cylinders 10a through 10d. The pressures P'B and Pc were measured with the valves 52 closed.

Figure 7:
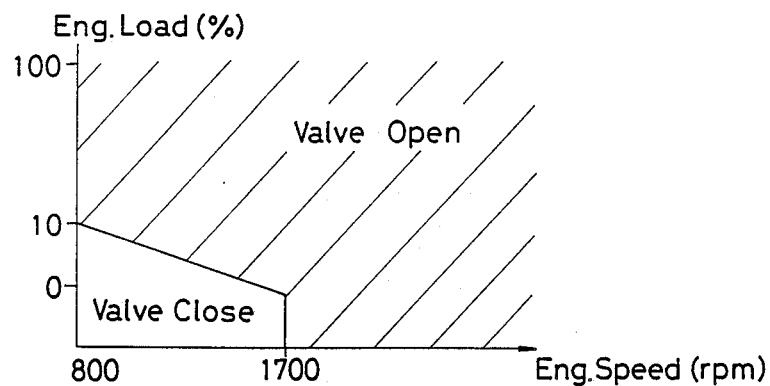
FIG. 7 is a graph shown operational conditions of a secondary throttle valve in the present invention.

On the other hand, during high-load operation of the engine 18, as the throttle valve 44 opens wider and the pressure of air discharges from the supercharger 42 increases, the intake air pressure in the independent passage 12 becomes greater than the exhaust gas pressure. During this operating condition, the secondary throttle valve 52 of each independent passage 12 is fully opened by the control unit 56, as shown in FIG. 7.

Therefore, during the overlapping time period at which the intake and exhaust valves 22, 26 of each of the cylinders 10a through 10d are open, the intake air having a pressure higher than that of the exhaust gases smoothly and effectively forces the residual exhaust gases in the cylinders 10a through 10d out into the exhaust passages, thereby remarkably contributing to the scavenging of the residual gases. Consequently, the rise of intake gas temperature during the compression stroke is reduced, thereby improving the anti-knock performance of the engine 18. This makes it possible to raise the compression ratio for increasing the output power of the engine 18 and improving fuel consumption.

Thus, by simply providing the secondary throttle valve 52 in each independent passage 12 which is part of the intake air passage 30 and by controlling the opening and closing of this valve 52 in accordance with the load on the engine 18, combustion stability of the supercharged engine can be maintained during light-load operation and the adoption of a high compression ratio can be realized, without any complicated structure such as a variable valve timing mechanism.

In the aforementioned embodiment, a mechanical supercharger 42 is used as the supercharger; the present invention, however, can also be supercharged by a turbosupercharger which supercharges the intake air during high-load operation of the engine.

Also in the aforementioned embodiment, the secondary throttle valve 52 is disposed in the independent passage 12 separately from the main throttle valve 44. If desired, a main throttle valve may be provided in each independent passage and may serve also as a secondary throttle valve. With this modification, however, there is a possibility that the supply of fuel by the injector 50 is delayed in relation to the opening of the throttle valve. To solve this problem, it will be necessary to, for example, inject the fuel directly into the combustion chamber in the cylinder.

As described hereinabove, according to this embodiment, the secondary throttle valve 52 is disposed in the independent passage 12 which communicates with the intake port 24 of each of the cylinders 10a through 10d of the engine provided with the supercharger 24. This secondary throttle valve 52 is controlled to open during, for example, a high-load operating condition of the engine 18 in which the intake air pressure rises above the exhaust pressure, and to close during other operation conditions including at least a low-speed, light-load condition. During high-load operation of the engine 18, therefore, the scavenging of the residual exhaust gases in the cylinders 10a through 10d can be enhanced by utilizing the relatively long overlapping time period of the intake/exhaust valves. During light-load operation, etc. of the engine 18 in which the intake air pressure decreases below the exhaust pressure by a large amount, the back flow of the residual exhaust gases from the cylinders into the intake air passage can effectively be restrained, despite the aforesaid relatively long overlapping time period, by the secondary throttle valve 52, thus improving and maintaining the combustion stability of the engine 18. The high compression ratio can be achieved while maintaining the combustion stability during light-load operation of the supercharged engine, by a simple throttle mechanism and without using a variable valve timing mechanism and the like. Consequently, power output and fuel consumption of the supercharged engine can be improved.

Second Embodiment

Next the second embodiment of the present invention will be described with reference to FIGS. 3 through 14.

In FIG. 9, numeral 20 indicates an engine, and numerals 10a through 10d are cylinders of the engine 20. The geometric compression ratio of this engine 20 is above 8.5. To this engine 20 are connected an intake manifold 72 of an intake air passage 70 and an exhaust manifold 76 of an exhaust passage 74. A turbosupercharger 78 is provided which has a turbine 80 disposed in the exhaust passage 74 and a compressor 82 in the intake air passage 70 that is connected with the turbine 80, and is driven by the exhaust gases to supercharge the air.

The aforementioned exhaust passage 74 is provided with a bypass passage 84 which bypasses the turbine 80, and a waste gate valve 86 is mounted in the bypass 84 to open and close it in accordance with a supercharge pressure or boost, thereby regulating the flow rate of exhaust gases into the turbine 80 to control the maximum boost. Also provided in the intake air passage 70 are an intercooler 88 for cooling the supercharged intake air and a throttle valve 90 which controls the flow rate of intake air in accordance with the operation of an accelerator.

Intake ports 92, 94 and an exhaust port 96 are open to the combustion chamber of each of the cylinders 10a through 10d. These ports are designed to be opened and closed by intake valves and an exhaust valve (not illustrated) which are operated by a known valve mechanism. In this embodiment, a primary intake port 92 and secondary intake port 94 are provided and have different closing timings. The intake manifold 72 includes four pairs of independent passages, each pair comprising a first passage 14 connected to the primary port 92 and a second passage 16 to the secondary port 94. The second independent passage 16 is provided with a shutter valve 98 to open and close this passage, which constitutes a variable timing device 100. Numeral 102 denotes a fuel injector which injects the fuel into the first and second independent passages 14 and 16 at points near the intake ports 92, 94.

Figure 10:
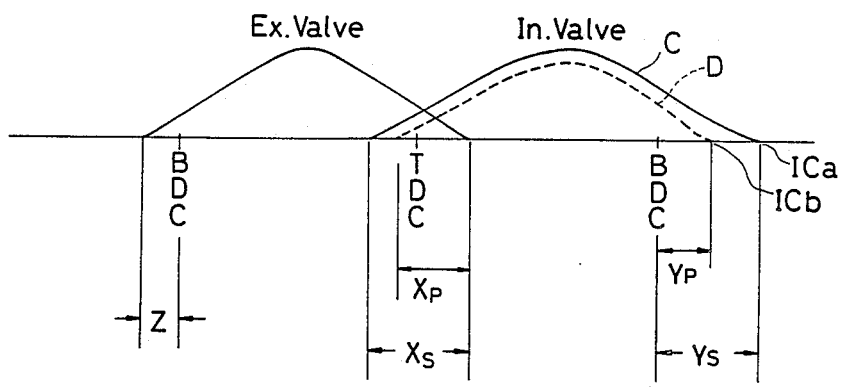
FIG. 10 is a characteristic curve diagram showing the movement of intake and exhaust valves in the present invention.

The opening characteristics of the intake ports 92, 94 are represented, as indicated in FIG. 10, by a curve C (the opening characteristic of the secondary port 94) and a curve D (the opening characteristic of the primary port 92). That is, the opening timings of the intake ports 92, 94 are set such that, immediately before TDC, the secondary port 94 opens first, followed by the opening of primary port 92. Also, the closing timing as indicated by ICa of the secondary port 94 is set to terminate (first closing timing) later than that of the primary port 92, and the closing timing ICb of the primary port 92 (second closing timing) is substantially the same as that of conventional engines. These port opening characteristics are achieved by a cam having an appropriate profile, etc., of the valve mechanism.

The overlapping time period of the opening of secondary port 94 and exhaust port 96 is expressed as an overlapping angle Xs in relation to the crank angle, the term "opening" being again effected by a valve lift of 1 mm, and the crank angle after the piston reaches BDC is used to define the secondary port closing timing Ys in which the term "closing" means that the secondary port 94 is closed at a valve lift of 1 mm. In FIG. 10 Xs and Ys are set so that they effect a mean effective pressure Pe within the region G of FIG. 3.

Similarly, the overlapping angle of the primary port 92 and the exhaust port 96 is illustrated as Xp and the primary port closing timing if Yp. When the shutter valve 98 is closed, Xp becomes an effective overlapping angle while Yp will be an effective intake port closing timing.

The opening and closing operation of the shutter valve 98 in the variable timing device 100 is controlled by an electric control device 104 through an actuator 106. The control device 104 receives signals from a speed sensor 108 which detects the engine speed, a pressure sensor 110 which detects pressure in the intake air passage at a point downstream of the throttle valve 90, and from a throttle opening sensor 112 which detects the degree of opening of the throttle valve 90. The control unit 104 opens the shutter valve 98 at least during high-speed, high-load operation of the engine, and closes the shutter valve 98 during low-speed operation of the engine when under a predetermined high load at which operation the volume of the supercharged air is still small.

Figure 11:
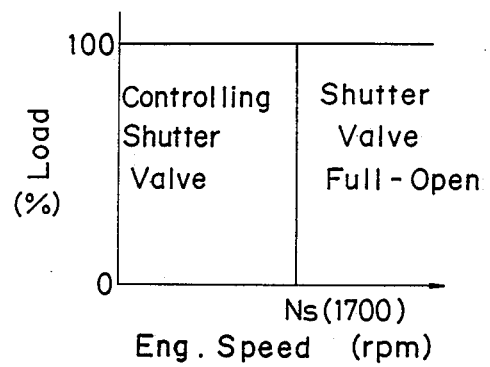
FIG. 11 is a graph showing engine conditions in connection with the control of a shutter valve in the present invention.

According to this embodiment, as shown in FIG. 11, the shutter valve 98 is completely open during the high-load operation as well as during the medium- and low-load operation while the engine is operating at a high speed over Ns. Also, during low-speed operation, i.e. when the specific speed is less than Ns, the shutter valve 98 is so controlled that it will be closed when the engine is under a high load during the initial period of acceleration.

Figure 12:
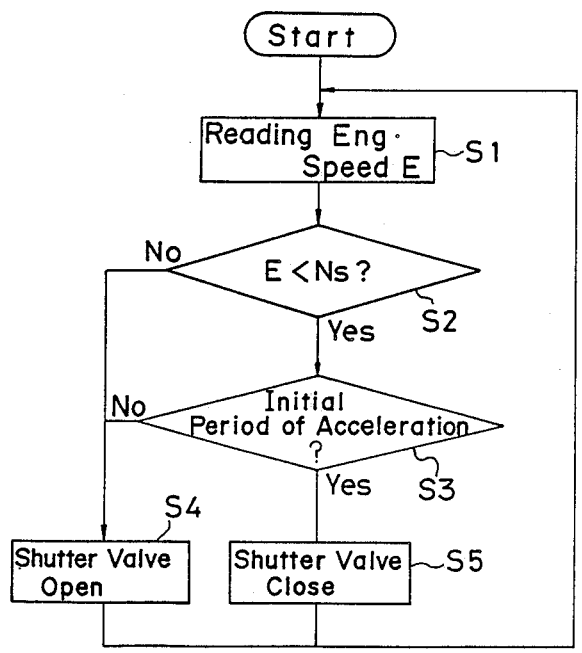
FIG. 12 is a flow chart for controlling the shutter valve.

This control is shown by a flowchart in FIG. 12. In this drawing, the engine speed E is read at Step S1; at Step S2, whether this engine speed E is lower than the specific speed Ns is determined; if E<Ns, whether the engine is initially accelerating the vehicle is determined at Step S3; and the shutter valve 20 will be opened at Step S4 if either of these determinations are "NO" and closed at Step S5 if both of these determinations are "YES". When it is determined that E≧Ns at Step S2, the shutter valve 98 is immediately opened at Step S4.

Figure 13:
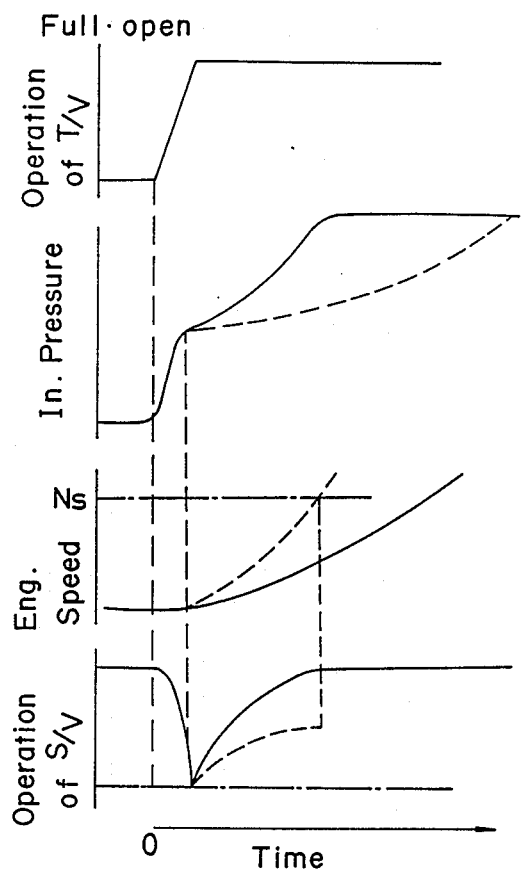
FIG. 13 is a time chart showing the control of the shutter valve during acceleration.

Therefore, when the engine is operating at a low speed under a low load in which the throttle opening is small, the shutter valve 98 is opened as shown in FIG. 13. However, during the initial period of acceleration in which the throttle opens wider, the shutter valve 98 is closed, and thereafter the shutter valve 98 is gradually opened in accordance with the rise of pressure in the intake air passage (see the full-line curve in FIG. 13). If the engine speed reaches the specific speed Ns before the boost is sufficiently raised, the shutter valve 98 is fully opened immediately (see the broken-line curve in FIG. 13).

It is to be noted here that the determination as to whether the engine is operating at the initial period of acceleration, at Step S3 in FIG. 12, may be performed by, for example, determining whether two seconds have lapsed after the start of acceleration.

The operation of the supercharged engine of the abovedescribed embodiment will be described hereinbelow.

When the shutter valve 98 is opened, the air is supplied into the combustion chamber through both intake ports 92, 94. Accordingly, the first closing timing ICa of the secondary port 94 is a practical intake port closing timing. Thus, despite the high geometric compression ratio of the present engine as compared with the conventional supercharged engines, the effective compression ratio is moderately lowered because the intake port closing timing is retarded. This relation has already been discussed with reference to FIG. 4.

In FIG. 4, the range indicated by oblique broken lines is for conventional supercharged engines, and the range indicated by oblique solid lines is for the present invention in which the effective compression ratio is moderately set by the geometric compression ratio (over 8.5) and the first closing timing ICa.

In the conventional supercharged engines, as shown in this graph, the geometric compression ratio is 7.5 to 8.5, and the intake port closing timing is around 20 to 40 degrees ABDC. Within this range, therefore, an adequate effective compression ratio is obtained to prevent knocking and to insure combustion stability during high supercharge or boost.

On the other hand, the engine of the present invention has a geometric compression ratio of over 8.5, which is higher than conventional compression ratios, and also the first closing timing ICa is over 50 degrees ABDC, which occurs later in the operation cycle than does the conventional intake port closing timing. Thus, as far as the first closing timing ICa is executed, the effective compression ratio can be established, for example, at about the same level as conventional ones.

Alternatively, since the clearance volume is decreased resulting in a corresponding diminishment in the amount of residual gases as the geometric compression ratio is increased, high combustion stability can be ensured and accordingly, the effective compression ratio can be set lower than conventional ones.

It is desirable that the effective compression ratio be established within the specific range shown in FIG. 4. When the geometric compression ratio and the first closing timing ICa are to be determined, the delay of the first closing timing ICa should be increased with the increase of the geometric compression ratio so that a mean effective pressure Pe within the range indicated by oblique lines in FIG. 5 will be effected.

Since the intake port is closed at the first closing timing ICa during high-speed, high-load operation, the effective compression ratio is lowered to thereby prevent knocking. Also, since the expansion ratio is comparatively high due to the comparatively high geometric compression ratio, the exhaust gas temperature is comparatively low. Consequently, the reliability of the exhaust system can be maintained without enriching the air-fuel ratio during high speed operation as in conventional engines. Furthermore, the cycle efficiency is enhanced due to the comparatively high expansion ratio.

As mentioned above, the intake port in this embodiment is operated under the first closing timing even during the medium- and low-load operating conditions of the engine. During such conditions, the mixture that has excessively been drawn in will be returned to the intake system while the intake port is open after the piston reaches BDC with the throttle valve 90 so preadjusted as to reduce the negative intake pressure below conventional ones. Therefore, a pumping loss, which is caused by the negative intake pressure, can be reduced.

On the other hand, when the engine is operating at a low-speed high load condition during the initial period of acceleration, the shutter valve 98 of the variable device 100 is closed to shut off the supply of the intake air from the secondary port 94. Therefore, the second closing timing ICb which is the closing timing of the primary port 92 becomes a practical intake port closing timing, thus effectively increasing the engine output power to prevent the lowering of the engine performance during acceleration. That is, when the engine is operating at a low speed, the volume of supercharged air is relatively small despite the engine being under a great load. Particularly when a turbosupercharger 78 is employed, the volume of supercharged air during the initial period of acceleration is small due to a response lag (so-called turbo lag) that varies with the engine load. During such engine operating conditions, if the intake port is operated at the first closing timing ICa, there is a possibility that the engine output power will decrease due to a back flow of the mixture and the like. Therefore, during the initial period of acceleration under low supercharging the intake port closing timing should be advanced, thereby preventing the back flow of intake air while increasing the effective compression ratio. By taking these measure the performance of the engine during acceleration can be enhanced.

In the embodiment described above, a turbosupercharger is used for supercharging but a mechanical-supercharger which is driven by the engine output power may alternatively be employed. If such a mechanical-supercharger is employed, unlike the turbosupercharger, a high boost can be obtained throughout a wide range of engine speeds and therefore the overlapping time period may become larger at high engine speed. The charging efficiency generally tends to become lower as the intake port closing timing is delayed. However, since a sufficient volume of air can be charged by the mechanical supercharger substantially at the time of acceleration, there is no problem created with respect to engine performance during acceleration. In addition, the overlapping time period results in an increase in the volume of the charge for scavenging during low-speed, high-load operation while decreasing the boost. This reduces a driving resistance of the supercharger, resulting in an increase of engine torque and an improvement in fuel economy.

Figure 14:
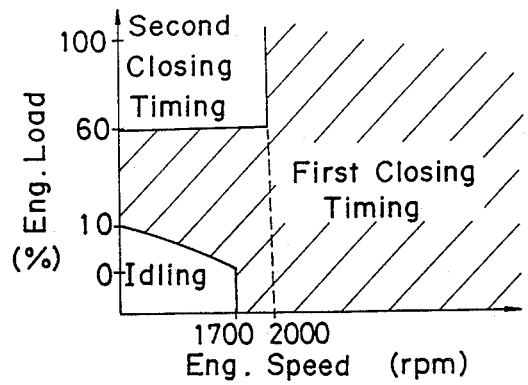
FIG. 14 is a graph showing another example of the control of the shutter valve.

The control of the variable timing device 100 may also be executed as shown in FIG. 14 in accordance with the engine speed and engine load. Particularly, when the mechanical supercharger is employed, the control shown in FIG. 14 is preferable. Thus, the intake port is closed at the first closing timing ICa during high-speed, high-load operation as well as during the medium- and low-load operation (except when idling) as indicated by oblique lines in FIG. 14, whereby the exhaust gas temperature can be lowered even during high-speed, high-load operation and the pumping loss may be reduced during medium- and low-load operation, as in the control of FIGS. 11 to 13. On the other hand, during high-load, low-speed operation in which the volume of supercharged air is small, the intake port is closed at the second closing timing ICb provided that the latter is set to more than 50 degrees ABDC. This increases the effective compression ratio for improving the engine output power. It is also desirable to employ the second closing timing during idling for the purpose of enhancing the combustion rate.

Other devices may be employed as the variable timing device. Examples thereof include a valve stop mechanism which enables the operation of the intake valve of the secondary port 94 to be stopped, and a timing change mechanism which can vary the intake valve operating timing. Furthermore, the overlapping time period of the intake and exhaust ports may be controlled to gradually increase with an increase in load, by the use of a motor which can be mounted on an inlet cam and which enables the intake valve phase of the secondary port 94 to be adjusted.

When the latter device is employed to change the phase of the intake valve by the motor, the intake valve of the primary port 92 as well as the intake valve of the secondary port 94 may be controlled simultaneously. This device may also be employed according to the invention in an engine having a single intake valve.

The control of the overlapping time period may be effected by directly comparing an intake pressure and an exhaust pressure sensed by sensors. Furthermore, the overlapping time period may be varied by changing the exhaust port closing timing.

In the supercharged engine of the second embodiment, the geometric compression ratio of engine is higher than that of conventional supercharged engines and, during at least high-speed, high-load operation, the intake port is closed under the first closing timing which is effected relatively later than that of the second closing timing, thus moderately decreasing the effective compression ratio while increasing the expansion ratio. Accordingly, the excessive rise of exhaust gas temperature can be prevented without enriching the air-fuel ratio, and also the cycle efficiency can be enhanced, thereby improving fuel economy during high-speed operation.

During a low-speed operation and under a predetermined high load, a high effective compression ratio is obtained by closing the intake port under the second closing timing which is effected earlier than the first closing timing, whereby the engine output power may be improved during low-speed operation in which the volume of supercharged air is relatively small.

As is obvious from the description above, the present invention provides geometric compression ratio in a supercharged engine of over 8.5 which, in conventional engines, could not be established due to knock occurring especially at a high speed and high load, and at the same time, the overlapping angle is comparatively large to improve the exhaust efficiency, thereby lowering the intake temperature and increasing the charging efficiency, which results in achieving a wide knock limit and improved thermal efficiency. On the other hand, delaying the intake port closing timing increases the expansion ratio, thus also lowering the exhaust gas temperature and improving the thermal efficiency. Both of these advantages can be simultaneously realized due to the ideal correlation of the overlapping angle with the intake port closing timing employed in designing the present invention. It is therefore possible to lower the exhaust gas temperature without enriching the air-fuel ratio particularly at a high speed and high load. This factor, along with the increase of thermal efficiency, results in a remarkable improvement in the fuel consumption of the supercharged engine.

Although the present invention has been described with reference to the preferred embodiments thereof, many modifications and alterations may be made within the spirit of the invention.

We claim:

1. A supercharged engine comprising:
   a cylinder;
   a piston slidably received in said cylinder and reciprocatingly movable therein, said piston and said cylinder defining a combustion chamber therebetween,
   the engine having a geometric compression ratio of at least 8.5;
   a crank rotatably mounted in the engine and operatively connected to said piston, said crank limiting reciprocal movement of said piston within said cylinder between a top dead center position and a bottom dead center position, and said crank rotating as said piston reciprocates in said cylinder;
   an engine output means operatively connected to said crank for generating an engine output from the rotation of said crank;
   an intake port means open to said combustion chamber, and through which charges of intake air pass to said combustion chamber;
   an intake passage open to said intake port means;
   a mechanical supercharger operatively disposed in said intake passage and connected to said engine output means so as to be driven by the engine output for pressurizing the charges of intake air supplied to said combustion chamber through said intake port means;
   an intake valve operatively disposed in said intake port means for opening and closing to open and close said intake port means;
   an exhaust port means open to said combustion chamber and through which exhaust gases generated in said chamber are discharged therefrom;
   an exhaust valve operatively disposed in said exhaust port means for opening and closing to open and close said exhaust port means;
   the opening and closing of said valves being based on a valve lift of 1 mm, and the engine having a valve timing which can be operatively established to satisfy the equation $$Y \geq -1.75X + 10$$

wherein Y is the timing of the closing of said intake port means as represented by the crank angle taken between when the piston is at the bottom dead center position and when the intake valve is closed, and X is an overlap angle representing a time period during which both said intake valve and said exhaust valve are open and equal to the crank angle take between when the intake valve is open and when the exhaust valve is closed.

2. A supercharged engine as claimed in claim 1, wherein the engine has an effective compression ratio greater than 6.5.

3. A supercharged engine as claimed in claim 1, wherein the valve timing can be operatively established to further satisfy the equation $$Y > Z$$

wherein Z is the timing of the opening of said exhaust port means as represented by the crank angle take between when said exhaust valve opens and when the piston is at the dead center position.

4. A supercharged engine as claimed in claim 1, wherein an independent air passage extends between said intake port means and the intake passage in which said mechanical supercharger is operatively disposed, and further comprising
   a throttle valve disposed in said independent air passage, an actuator operatively connected to said throttle valve for opening and closing said throttle valve, and control means operatively connected to said actuator for controller said actuator to close said throttle valve when the engine is operating under a relatively light load while at a low speed.

5. A supercharged engine as claimed in claim 1, wherein $$X \leq 40°.$$

6. A supercharged engine as claimed in claim 1, and further comprising variable overlap means for effectively changing said overlap angle X from a first overlap angle satisfying said equation and a second overlap angle less than said first overlap angle, and control means operatively connected to said variable overlap means for controlling said overlap means to establish said first overlap angle when the engine is operating under a relatively high load while at a high speed.

7. A supercharged engine as claimed in claim 1, and further comprising exhaust gas reducing means for suppressing the amount of exhaust gas flowing into said combustion chamber as the charges of intake air are supplied to said combustion chamber when the engine is operating under a light load including idling while at a low speed as compared to the amount of exhaust gas flowing into said combustion chamber as the charges of air are supplied to said combustion chamber when the engine is operating at a high speed.

8. A supercharged engine as claimed in claim 7, wherein said exhaust gas reducing means suppresses the amounts of exhaust gas flowing into said combustion chamber by effectively reducing said overlap angle.

9. A supercharged engine as claimed in claim 8, wherein said exhaust gas reducing means effectively reduces said overlap angle by delaying the effective opening of said intake port means.

10. A supercharged engine as claimed in claim 7, and further comprising a first throttle valve disposed in said intake passage, and an independent air passage extending between and open to said intake passage and said intake port means, and wherein said exhaust gas reducing means comprises a second throttle valve disposed in said independent air passage.

11. A supercharged engine as claimed in claim 7, wherein said light load is 10% of the maximum engine load.

12. A supercharged engine as claimed in claim 1, and further comprising variable valve timing means for changing said timing of the closing of said intake port means from a first intake port means closing timing which satisfies said equation to a second intake port means closing timing in which said intake port means is effectively closed earlier in the engine cycle than when said first intake port means closing timing is established, and control means operatively connected to said variable valve timing means for controlling said variable valve timing means to establish said first intake port means closing timing whenever the engine is operating at a high speed, and for controlling said variable valve timing means to establish said second intake port means closing timing when said engine is operating under a relatively high load while at a low speed.

13. A supercharged engine as claimed in claim 12, wherein said control means controls said variable valve timing means to establish said second intake port mans closing timing whenever the engine is initially accelerating.

14. A supercharged engine as claimed in claim 12, wherein said control means controls said variable valve timing means to establish said second intake port means closing timing when the engine is operating under a light load while at a low speed.

15. A supercharged engine as claimed in claim 14, wherein said light load is 10% of the maximum engine load.

16. A supercharged engine as claimed in claim 1, wherein said valve timing satisfies said equation whenever the engine is operating at a high speed.

17. A supercharged engine as claimed in claim 1, where $$X \geq -40°.$$

18. A supercharged engine comprising:
a cylinder;
a piston slidably received in said cylinder and reciprocatingly movable therein, said piston and said cylinder defining a combustion chamber therebetween,
the engine having a geometric compression ratio of at least 8.5;
a crank rotatably mounted in the engine and operatively connected to said piston, said crank limiting reciprocal movement of said piston within said cylinder between a top dead center position and a bottom dead center position, and said crank rotating as said piston reciprocates in said cylinder;
an intake port mans open to said combustion chamber, and through which charges of intake air pass to said combustion chamber;
an intake passage open to said intake port means;
a turbocharger and an intake air passage open to said turbocharger and said intake port means for pressurizing the charges of intake air supplied to said combustion chamber through said intake port means;
cooling means disposed in said intake air passage for cooling charges of air pressurized by said supercharger;
an intake valve operatively disposed in said intake port means for opening and closing to open and close said intake port means;
an exhaust port means open to said combustion chamber and through which exhaust gases generated in said chamber are discharged therefrom;
an exhaust valve operatively disposed in said exhaust port means for opening and closing to open and close said exhaust port means;
the opening and closing of said valve being based on a valve lift of 1 mm, and the engine having a valve timing which can be operatively established to satisfy the equations $$Y \geq 50°$$

$$Y \geq -1.75X + 10$$

wherein X is an overlap angle representing a time period during which both said intake valve and said exhaust valve are open and equal to the crank angle taken between when the intake valve is open and when the exhaust valve is closed, and Y is the timing of the closing of said intake port means as represented by the crank angle taken between when the piston is at the bottom dead center position and when the intake valve is closed.

19. A supercharged engine as claimed in claim 18, wherein $$X \leq 40°.$$

20. A supercharged engine comprising:
a cylinder;
a piston slidably received in said cylinder and reciprocatingly movable therein, said piston and said cylinder defining a combustion chamber therebetween,
the engine having a geometric compression ratio of at least 8.5;
a crank rotatably mounted in the engine and operatively connected to said piston, said crank limiting reciprocal movement of said piston within said cylinder between a top dead center position and a bottom dead center position, and said crank rotating as said piston reciprocates in said cylinder;
an intake port means open to said combustion chamber, and through which charges of intake air pass to said combustion chamber;
an intake passage open to said intake port means;
a turbocharger and an intake air passage open to said turbocharger and said intake port means for pressurizing the charges of intake air supplied to said combustion chamber through said intake port means;
cooling means disposed in said intake air passage for cooling charges of air pressurized by said supercharger;
an intake valve operatively disposed in said intake port means for opening and closing to open and close said intake port means;
an exhaust port means open to said combustion chamber and through which exhaust gases generated in said chamber are discharged therefrom;
an exhaust valve operatively disposed in said exhaust port means for opening and closing to open and close said exhaust port means;
the opening and closing of said valves being based on a valve lift of 1 mm, and the engine having a valve timing which can be operatively established to satisfy the equation $$Y \geq 50°$$

wherein Y is the timing of the closing of said intake port means as represented by the crank angle taken between when the piston is at the bottom dead center position and when the intake valve is closed;
variable valve timing means for changing said timing of the closing of said intake port means from a first intake port means closing timing which satisfies said equation to a second intake port means closing timing in which said intake port means is effectively closed earlier in the engine cycle than when said first intake port means closing timing is established; and
control means operatively connected to said variable valve timing means for controlling said variable valve timing means to establish said first intake port means closing timing whenever the engine is operating at a high speed, and for controlling said variable valve timing means to establish said second intake port means closing timing when said engine is operating under a relatively high load while at a low speed.

21. A supercharged engine comprising:
a cylinder;
a piston slidably received in said cylinder and reciprocatingly movable therein, said piston and said cylinder defining a combustion chamber therebetween,
the engine having a geometric compression ratio of at least 8.5;
a crank rotatably mounted in the engine and operatively connected to said piston, said crank limiting reciprocal movement of said piston within said cylinder between a top dead center position and a bottom dead center position, and said crank rotating as said piston reciprocates in said cylinder;
an intake port means open to said combustion chamber, and through which charges of intake air pass to said combustion chamber;
an intake passage open to said intake port means;
a turbocharger and an intake air passage open to said turbocharger and said intake port means for pressurizing the charges of intake air supplied to said combustion chamber through said intake port means;
cooling means disposed in said intake air passage for cooling charges of air pressurized by said supercharger;
an intake valve operatively disposed in said intake port means for opening and closing to open and close said intake port means;
an exhaust port means open to said combustion chamber and through which exhaust gases generated in said chamber are discharged therefrom;
an exhaust valve operatively disposed in said exhaust port means for opening and closing to open and close said exhaust port means;
the opening and closing of said valves being based on a valve lift of 1 mm, and the engine having a valve timing which can be operatively established to satisfy the equation $$Y \geq 50°$$

wherein Y is the timing of the closing of said intake port means as represented by the crank angle taken between when the piston is at the bottom dead center position and when the intake valve is closed;
and exhaust gas reducing means for suppressing the amount of exhaust gas flowing into said combustion chamber as the charges of intake air are supplied to said combustion chamber when the engine is operating under a light load including idling while at a low speed with respect to the amount of exhaust gas flowing into said combustion chamber as the charges of air are supplied to said combustion chamber when the engine is operating at a high speed.

22. A supercharged engine as claimed in claim 21, wherein said exhaust gas reducing means suppresses the amount of exhaust gas flowing into said combustion chamber by effectively reducing said overlap angle.

23. A supercharged engine as claimed in claim 22, wherein said exhaust gas reducing means effectively reduces said overlap angle by delaying the effective opening of said intake port means.

24. A supercharged engine as claimed in claim 21, wherein said light load is 10 % of the maxium engine load.

25. A supercharged engine comprising:
a cylinder;
a piston slidably received in said cylinder and reciprocatingly movable therein, said piston and said cylinder defining a combustion chamber therebetween,
the engine having a geometric compression ratio of at least 8.5;
a crank rotatably mounted in the engine and operatively connected to said piston, said crank limiting reciprocal movement of said piston within said cylinder between a top dead center position and a bottom dead center position, and said crank rotating as said piston reciprocates in said cylinder;
an engine output means operatively connected to said crank for generating an engine output from the rotation of said crank;
an intake port means open to said combustion chamber, and through which charges of intake air pass to said combustion chamber;
an intake passage open to said intake port means;
a mechanical supercharger operatively disposed in said intake passage and connected to said engine output means so as to be driven by the engine output for pressurizing the charges of intake air supplied to said combustion chamber through said intake port means;
an intake valve operatively disposed in said intake port means for opening and closing to open and close said intake port means;
an exhaust port means open to said combustion chamber and through which exhaust gases generated in said chamber are discharged therefrom;
an exhaust valve operatively disposed in said exhaust port means for opening and closing to open and close said exhaust port means;
the opening and closing of said valves being based on a valve lift of 0 mm, and the engine having a valve timing which can be operatively established to satisfy the equation $$Y \geq -1.75X + 100$$

wherein Y is the timing of the closing of said intake port means as represented by the crank angle taken between when the piston is at the bottom dead center position and when the intake valve is closed, and X is an overlap angle representing a time period during which both said intake valve and said exhaust valve are open and equal to the crank angle taken between when the intake valve is open and when the exhaust valve is closed.

26. A supercharged engine as claimed in claim 25, wherein the engine has an effective compression ratio greater than 6.5.

27. A supercharged engine as claimed in claim 25, wherein the valve timing can be operatively established to further satisfy the equation $$Y > Z$$

wherein Z is the timing of the opening of said exhaust port means as represented by the crank angle taken between when said exhaust valve opens and when the piston is at the dead center position.

28. A supercharged engine as claimed in claim 25, wherein $$X \leq 80°.$$

29. A supercharged engine as claimed in claim 25, wherein said valve timing satisfies said equation whenever the engine is operating at a high speed.

30. A supercharged engine as claimed in claim 25, wherein $$Y \geq 70°.$$

31. A supercharged engine as claimed in claim 25, wherein $$X \geq 0°.$$

32. A supercharged engine comprising:
a cylinder;
a piston slidably received in said cylinder and reciprocatingly movable therein, said piston and said cylinder defining a combustion chamber therebetween,
the engine having a geometric compression ratio of at least 8.5;
a crank rotatably mounted in the engine and operatively connected to said piston, said crank limiting reciprocal movement of said piston within said cylinder between a top dead center position and a bottom dead center position, and said crank rotating as said piston reciprocates in said cylinder;
an intake port means open to said combustion chamber, and through which charges of intake air pass to said combustion chamber;
an intake passage open to said intake port means;
a turbocharger and an intake air passage open to said turbocharger and said intake port means for pressurizing the charges of intake air supplied to said combustion chamber through said intake port means;
cooling means disposed in said intake air passage for cooling charges of air pressurized by said supercharger;
an intake valve operatively disposed in said intake port means for opening and closing to open and close said intake port means;
an exhaust port means open to said combustion chamber and through which exhaust gases generated in said chamber are discharged therefrom;
an exhaust valve operatively disposed in said exhaust port means for opening and closing to open and close said exhaust port means;
the opening and closing of said valves being based on a valve lift of 1 mm, and the engine having a valve timing which can be operatively established to satisfy the equations $$Y \geq 50°$$

$$Y \geq -1.75X + 100$$

wherein X is an overlap angle representing a time period during which both said intake valve and said exhaust valve are open and equal to the crank angle taken between when the intake valve is open and when the exhaust valve is closed, and Y is the timing of the closing of said intake port means as represented by the crank angle taken between when the piston is at the bottom dead center position and when the intake valve is closed.

33. A supercharged engine as claimed in claim 22, wherein $X \leq 80°$.

34. A supercharged engine comprising:
a cylinder;
a piston slidably received in said cylinder and reciprocatingly movable therein, said piston and said cylinder defining a combustion chamber therebetween,
the engine having a geometric compression ratio of at least 8.5;
a crank rotatably mounted in the engine and operatively connected to said piston, said crank limiting reciprocal movement of said piston within said cylinder between a top dead center position and a bottom dead center position, and said crank rotating as said piston reciprocates in said cylinder;
an intake port means open to said combustion chamber, and through which charges of intake air pass to said combustion chamber;
an intake passage open to said intake port means;
a turbocharger and an intake air passage open to said turbocharger and said intake port means for pressurizing the charges of intake air supplied to said combustion chamber through said intake port means;
cooling means disposed in said intake air passage for cooling charges of air pressurized by said supercharger;
an intake valve operatively disposed in said intake port means for opening and closing to open and close said intake port means;
an exhaust port means open to said combustion chamber and through which exhaust gases generated in said chamber are discharged therefrom;
an exhaust valve operatively disposed in said exhaust port means for opening and closing to open and close said exhaust port means;
the opening and closing of said valves being based on a valve lift of 1 mm, and the engine having a valve timing which can be operatively established to satisfy the equation $Y \geq 50°$ wherein Y is the timing of the closing of said intake port means as represented by the crank angle taken between when the piston is at the bottom dead center position and when the intake valve is closed;
variable valve timing means for changing said timing of the closing of said intake port means from a first intake port means closing timing which satisfies said equation to a second intake port means closing timing in which said intake port means is effectively closed earlier in the engine cycle than when said first intake port means closing time is established; and
control means operatively connected to said variable valve timing means for controlling said variable valve timing means to establish said first intake port means closing timing whenever the engine is operating at a high speed, and for controlling said variable valve timing means to establish said second intake port means closing timing when said engine is operating under a relatively high load while at a low speed.

35. A supercharged engine comprising:
a cylinder;
a piston slidably received in said cylinder and reciprocatingly movable therein, said piston and said cylinder defining a combustion chamber therebetween,
the engine having a geometric compression ratio of at least 8.5;
a crank rotatably mounted in the engine and operatively connected to said piston, said crank limiting reciprocal movement of said piston within said cylinder between a top dead center position and a bottom dead center position, and said crank rotating as said piston reciprocates in said cylinder;
an intake port means open to said combustion chamber, and through which charges of intake air pass to said combustion chamber;
an intake passage open to said intake port means;
a turbocharger and an intake air passage open to said turbocharger and said intake port means for pressurizing the charges of intake air supplied to said combustion chamber through said intake port means;
cooling means disposed in said intake air passage for cooling charges of air pressurized by said supercharger;
an intake valve operatively disposed in said intake port means for opening and closing to open and close said intake port means;
an exhaust port means open to said combustion chamber and through which exhaust gases generated in said chamber are discharged therefrom;
an exhaust valve operatively disposed in said exhaust port means for opening and closing to open and close said exhaust port means;
the opening and closing of said valves being based on a valve lift of 1 mm, and the engine having a valve timing which can be operatively established to satisfy the equation $Y \geq 50°$ wherein Y is the timing of the closing of said intake port means as represented by the crank angle taken between when the piston is at the bottom dead center position and when the intake valve is closed;
and exhaust gas reducing means for suppressing the amount of exhaust gas flowing into said combustion chamber as the charges of intake air are supplied to said combustion chamber when the engine is operating under a light load including idling while at a low speed with respect to the amount of exhaust gas flowing into said combustion chamber as the charges of air of supplied to said combustion chamber when the engine is operating at a high speed.

36. A supercharged engine as claimed in claim 35, wherein said exhaust gas reducing means suppresses the amounts of exhaust gas flowing into said combustion chamber by effectively reducing said overlap angle.

37. A supercharged engine as claimed in claim 36, wherein said exhaust gas reducing means effectively reduces said overlap angle by delaying the effective opening of said intake port means.

38. A supercharged engine as claimed in claim 35, wherein said light load is 10% of the maximum engine load.

39. A method of improving operational characteristics in a supercharged engine having a cylinder, a piston slidably received in the cylinder and reciprocatingly movable therein, the piston and the cylinder defining a combustion chamber therebetween, a crank rotatably mounted in the engine and operatively connected to the piston, the crank limiting reciprocal movement of the piston within the cylinder between a top dead center position and bottom dean center position, and the crank rotating as the piston reciprocates in the cylinder, an engine output means operatively connected to said crank for operating an engine output from the rotation of said crank, an intake port means open to the combustion chamber and through which charges of intake air pass to the combustion chamber, an intake passage open to the intake port means, a mechanical supercharger operatively disposed in the intake air passage for pressurizing the charges of intake air supplied to said combustion chamber through said intake port means, and an intake valve operatively disposed in the intake port means for opening and closing to open and close the intake port means, an exhaust port means open to the combustion chamber and through which exhaust gases generated in the chamber are discharged therefrom, an exhaust valve operatively disposed in the exhaust port means for opening and closing to open and close the exhaust port means, and the opening and closing of said valves being based on a valve lift of 1 mm, said method comprising:

operatively establishing the valve timing to satisfy the equation $Y \geq -1.75X + 10$ wherein Y is the timing of the closing of said intake port means as represented by the crank angle taken between when the piston is at the bottom dead center position and when the intake valve is closed, and X is an overlap angle representing a time period during which both said intake valve and said exhaust valve are open and equal to the crank angle taken between when the intake valve is open and when the exhaust valve is closed;

providing a geometric compression ratio of the engine of at least 8.5;

driving the mechanical supercharger off of the engine output to pressurize the charges of the intake air supplied to the combustion chamber; and suppressing the amount of exhaust gas flowing into the combustion chamber as the charges of intake air are supplied to the combustion chamber when the engine is operating under an extra-light load while at a low speed with respect to the amount of exhaust gas flowing into said combustion chamber as the charges of air are supplied to said combustion chamber when the engine is operating at a high speed.

40. A method of improving operational characteristics is a supercharged engine having a cylinder, a piston slidably received in the cylinder and reciprocatingly movable therein, the piston and the cylinder defining a combustion chamber therebetween, a crank rotatably mounted in the engine and operatively connected to the piston, the crank limiting reciprocal movement of the piston within the cylinder between a top dead center position and bottom dead center position, and the crank rotating as the piston reciprocates in the cylinder, an engine output means operatively connected to said crank for operating an engine output from the rotation of said crank, an intake port means open to the combustion chamber and through which charges of intake air pass to the combustion chamber, an intake passage open to the intake port means, a mechanical supercharger operatively disposed in the intake air passage for pressurizing the charges of intake air supplied to said combustion chamber through said intake port means, and an intake valve operatively disposed in the intake port means for opening and closing to open and close the intake port means, an exhaust port open to the combustion chamber and through which exhaust gases generated in the chamber are discharged therefrom, an exhaust valve operatively disposed in the exhaust port means for opening and closing to open and close the exhaust port means, and the opening and closing of the valves being based on a valve lift of 1 mm, said method comprising:

operatively establishing the valve timing to satisfy the equation $Y \geq -1.75X + 10$ wherein the engine operates at a high speed, and wherein Y is the timing of the closing of said intake port means as represented by the crank angle taken between when the piston is at the bottom dead center position and when the intake valve is closed, and X is an overlap angle representing a time period during which both said intake valve and said exhaust valve are open and equal to the crank angle taken between when the intake valve is open and when the exhaust valve is closed;

providing a geometric compression ratio of the engine of at least 8.5; and driving the mechanical supercharger off of the engine output to pressurize the charges of the intake air supplied to the combustion chamber.

* * * * *